United States Patent
Barrientos Betancourt et al.

(10) Patent No.: US 10,690,031 B2
(45) Date of Patent: Jun. 23, 2020

(54) AFTERTREATMENT ARCHITECTURE FOR INTERNAL COMBUSTION ENGINE

(71) Applicant: GM GLOBAL TECHNOLOGY OPERATIONS LLC, Detroit, MI (US)

(72) Inventors: Eduardo Jose Barrientos Betancourt, Turin (IT); Roberto Romanato, Settimo Torinese (IT); Francesco Bechis, Piossasco (IT); Francesco Concetto Pesce, Turin (IT); Jaime Andres Cespedes Garcia, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 16/014,107

(22) Filed: Jun. 21, 2018

(65) Prior Publication Data
US 2019/0368402 A1 Dec. 5, 2019

Related U.S. Application Data

(60) Provisional application No. 62/678,573, filed on May 31, 2018.

(51) Int. Cl.
*F01N 3/20* (2006.01)
*F01N 3/08* (2006.01)
*F01N 13/00* (2010.01)

(52) U.S. Cl.
CPC ......... *F01N 3/2013* (2013.01); *F01N 3/0814* (2013.01); *F01N 3/0842* (2013.01);
(Continued)

(58) Field of Classification Search
CPC .......... B60K 6/12; B60K 6/20; B60W 10/06; B60W 10/08; B60W 20/16;
(Continued)

(56) References Cited

U.S. PATENT DOCUMENTS 6,109,025 A * 8/2000 Murata ................. B60K 6/24
60/297
6,729,125 B2 * 5/2004 Suga .................. B01D 53/9454
60/285

(Continued)

OTHER PUBLICATIONS

Atzler et al., "Fuel Consumption and Emissions Effects in Passenger Car Diesel Engines through the Use of a Belt Starter Generator" No. 2015-01-1162, SAE Technical Paper, Apr. 14, 2015 (9 pages).

(Continued)

*Primary Examiner* — Phutthiwat Wongwian
*Assistant Examiner* — Diem T Tran
(74) *Attorney, Agent, or Firm* — Cantor Colburn LLP (57) ABSTRACT

A method for treating exhaust gas emitted by an internal combustion engine (ICE) in a hybrid architected motor vehicle with an electric motor. The method includes disposing a heater in the exhaust, disposing a first Lean NOx Trap (LNT) downstream of the heater, disposing a second LNT downstream of the first LNT, disposing a passive selective catalytic reduction (SCR) downstream of the second LNT, disposing a hydrocarbon oxidation catalyst downstream of the SCR. The method also includes connecting a controller to the heater, the controller executes a method of controlling the NOx emissions of the ICE, the method includes monitoring a torque demand for the vehicle, determining if the torque demand is large enough to cause the ICE to generate excessive NOx, operating the ICE at a torque less than the torque demand, and operating the motor with the ICE to provide sufficient torque to satisfy the torque demand.

14 Claims, 5 Drawing Sheets

(52) U.S. Cl.
CPC ......... *F01N 3/0885* (2013.01); *F01N 3/2066* (2013.01); *F01N 13/009* (2014.06); *F01N 2240/16* (2013.01); *F01N 2250/12* (2013.01); *F01N 2560/026* (2013.01); *F01N 2560/06* (2013.01); *F01N 2570/14* (2013.01)

(58) Field of Classification Search
CPC .......... B60W 2710/06; B60W 2710/08; B60Y 2200/92; F01N 13/008; F01N 2590/11; F01N 2900/1404; F01N 3/033; F01N 3/2066; F01N 13/009; F01N 2240/16; F01N 2250/12; F01N 2560/026; F01N 2560/06; F01N 2570/14; F01N 3/0814; F01N 3/0842; F01N 3/0885; F01N 3/2013

See application file for complete search history.

(56) References Cited

U.S. PATENT DOCUMENTS

| | | | | |
|---|---|---|---|---|
| 2002/0038654 | A1* | 4/2002 | Sasaki | B60K 6/485 123/568.11 |
| 2008/0260610 | A1* | 10/2008 | Theis | F01N 3/0807 423/213.2 |
| 2011/0023480 | A1* | 2/2011 | Chyo | F01N 3/103 60/602 |
| 2015/0032308 | A1* | 1/2015 | Whitney | B60W 10/06 701/22 |
| 2017/0037799 | A1* | 2/2017 | Balenovic | F01N 9/00 |
| 2017/0114744 | A1* | 4/2017 | Martin | F02M 25/0818 |
| 2017/0167346 | A1 | 6/2017 | Barba et al. | |

OTHER PUBLICATIONS

Auld et al., "Assessment of Light Duty Diesel After-Treatment Technology Targeting Beyond Euro 6d Emissions Levels." SAE International Journal of Engines vol. 10 Issue 4, Oct. 2017 (13 pages).

Boerensen et al., "Twin-LNT System for Advanced Diesel Exhaust Gas Aftertreatment" SAE International Journal of Fuels and Lubricants vol. 10 Issue 2, Mar. 28, 2017 (15 pages).

Hadl et al., "System Analysis for Efficient and Clean Diesel Engine" MTZ worldwide <URL https://autotechreview.com/technology/system-analysis-for-efficient-and-clean-diesel-engine> [access Oct. 26, 2017] (12 pages).

Klein et al., "48 Volt Technology: For More Efficiency and Fun to Drive" Süddeutscher Verlag onpact, 2016 (38 pages).

Majewski "Selective catalytic reduction"<URL http://www.dieselnet.com/tech/cat_scr.php> [accessed May 18, 2018] (6 pages).

Nakatani et al., "Simultaneous PM and NOx reduction system for diesel engines" SAE Transactions, Jan. 2002 (10 pages).

Philipp et al., "Exhaust gas aftertreatment for lean gasoline direct injection engines-potential for future applications" No. 2013-01-1299, Apr. 8, 2013, SAE Technical Paper (8 pages).

Shimo et al., "The new small Diesel Engine Mazda Skyactiv-D 1.5" 24th Aachen Colloquium Autobie and Engine Technology (2015) pp. 981-1002.

Tonetti et al., "Diesel Engine Technologies Evolution for Future Challenges" SAE Technical Paper, No. 2017-24-0179. Sep. 4, 2017 (11 pages).

* cited by examiner

AFTERTREATMENT ARCHITECTURE FOR INTERNAL COMBUSTION ENGINE

CROSS-REFERENCE TO RELATED APPLICATIONS

This application claims the benefit of 62/678,573 filed May 31, 2018, which is incorporated herein by reference in its entirety.

INTRODUCTION

The present disclosure relates to exhaust systems for internal combustion engines, and more particularly to exhaust system aftertreatment for electrified hybrid vehicles having a NOx generating internal combustion engine, without diesel emission fluid injection for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components. An exhaust gas treatment system typically includes one or more treatment devices, such as oxidation catalyst (OC) devices, selective catalyst reduction (SCR) devices, particulate filters (PF), mixing elements and urea/fuel injectors. An oxidation catalyst device is provided in an exhaust system to treat unburned gaseous and non-volatile hydrocarbon (HC) and carbon monoxide (CO). The oxidation catalyst oxidizes the HC and CO under high temperature conditions to form carbon dioxide (CO2) and water (H2O).

Exhaust gas treatment systems also typically include selective catalytic reduction (SCR) devices. An SCR device includes a substrate having an SCR catalyst disposed thereon to reduce the amount of NOx in the exhaust gas. The typical exhaust treatment system also includes a reductant delivery system that injects a reductant such as, for example, ammonia (NH3), urea (CO(NH2)2, etc.) typically known as Diesel Emission Fluid (DEF). The SCR device makes use of NH3 in the DEF to reduce the NOx. For example, when NH3 is supplied to the SCR device under the proper conditions, the NH3 reacts with the NOx in the presence of the SCR catalyst to reduce the NOx emissions. However, reductant delivery systems can be cumbersome and expensive to operate. In addition, they require maintenance and resupply of the reductant. It would be desirable to avoid the need for reductant delivery systems and yet be able to satisfy emissions limitations for an engine.

SUMMARY

Described herein is a method for treating exhaust gas emitted by an internal combustion engine (ICE) in a hybrid architected motor vehicle with an electric motor. The method includes disposing a heater in the exhaust, disposing a first Lean NOx Trap (LNT) downstream of the heater, disposing a second LNT downstream of the first LNT, disposing a passive selective catalytic reduction (SCR) downstream of the second LNT, disposing a hydrocarbon oxidation catalyst downstream of the SCR. The method also includes connecting a controller to the heater, the controller executes a method of controlling the NOx emissions of the ICE, the method includes monitoring a torque demand for the vehicle, determining if the torque demand is large enough to cause the ICE to generate excessive NOx, operating the ICE at a torque less than the torque demand, and operating the motor with the ICE to provide sufficient torque to satisfy the torque demand.

Also described herein is an emissions control system for treating exhaust gas in a hybrid architected motor vehicle including a NOx generating internal combustion engine and an electric motor, each of the internal combustion engine and an electric motor configured to provide torque operably coupled to a drive train the vehicle. The emissions control system including a first electric heating device operably disposed in an exhaust conduit operably connected to the internal combustion engine, the exhaust conduit carrying the exhaust gas, a first Lean NOx Trap (LNT) device disposed in the exhaust conduit downstream of the first electric heating device, and a second LNT device disposed in the exhaust conduit downstream of the first LNT. The emissions control system also includes a passive selective catalytic reduction (SCR) device disposed in the exhaust conduit downstream of the second LNT device, a hydrocarbon oxidation catalyst device disposed in the exhaust conduit downstream of the passive SCR device, and a controller operably connected to the first electric heating device, the first NOx sensor, the first temperature sensor, the controller configured to execute a method of controlling the NOx emissions of the NOx generating internal combustion engine. The method that the controller executes includes monitoring a torque demand for the vehicle, determining if the torque demand is large enough to cause the internal combustion to generate NOx that exceeds a preselected threshold, operating the internal combustion engine at a reduced torque less than the torque demand; and operating the electric motor with the internal combustion engine to provide sufficient torque to satisfy the torque demand, wherein the reduced torque in addition to the sufficient torque equals the torque demand.

In addition to one or more of the features described above, or as an alternative, further embodiments may include a the controller executing a method further including determining if a regeneration of the first LNT device is required or in process, operating the internal combustion engine at a reduced preselected torque less than the torque demand, and operating the electric motor with the internal combustion engine to provide sufficient torque to satisfy the torque demand, wherein the reduced preselected torque in addition to the sufficient torque equals the torque demand.

In addition to one or more of the features described above, or as an alternative, further embodiments may include that the reduced preselected torque is based on at least one of an operating condition of the vehicle, an operating condition of the internal combustion engine, and the torque demand.

In addition to one or more of the features described above, or as an alternative, further embodiments may include that the reduced torque is based on at least one of an operating condition of the vehicle, an operating condition of the internal combustion engine, and the torque demand.

In addition to one or more of the features described above, or as an alternative, further embodiments may include that the first electric heating device is configured to facilitate regeneration of at least one of the first LNT device, the second LNT device, the passive SCR device and the hydrocarbon oxidation catalyst device.

In addition to one or more of the features described above, or as an alternative, further embodiments may include that the second LNT device is responsive to regeneration at a different temperature than the first LNT device.

In addition to one or more of the features described above, or as an alternative, further embodiments may include a the first electric heating device is operable during start-up of the internal combustion engine.

In addition to one or more of the features described above, or as an alternative, further embodiments may include a second electric heating device disposed in the exhaust conduit, the second electric heating device configured to facilitate regeneration of at least one of the second LNT device the SCR device, and the hydrocarbon oxidation catalyst device.

In addition to one or more of the features described above, or as an alternative, further embodiments may include that at least one of the second LNT device, the passive SCR device, and the hydrocarbon oxidation catalyst device comprises a particulate matter filter.

In addition to one or more of the features described above, or as an alternative, further embodiments may include a temperature sensor operably connected to the controller and in fluid communication with the exhaust gas.

In addition to one or more of the features described above, or as an alternative, further embodiments may include a NOx sensor operably connected to the controller and in fluid communication with the exhaust gas.

In addition to one or more of the features described above, or as an alternative, further embodiments may include that the determining is based on at least one of a chemical model of the first LNT device, a chemical model of the second LNT device, and chemical model of the passive SCR device.

Also described here in another embodiment is a method for treating exhaust gas emitted by a NOx generating internal combustion engine in a hybrid architected motor vehicle with an electric motor, where each of the internal combustion engine and an electric motor are configured to provide torque operably coupled to a drive train the vehicle. The method includes operably disposing a first electric heating device in the exhaust gas carried by an exhaust conduit operably connected to the internal combustion engine, operably disposing a first Lean NOx Trap (LNT) device in the exhaust conduit downstream of the first electric heating device, operably disposing a second LNT device in the exhaust conduit downstream of the first LNT device, operably disposing a passive selective catalytic reduction (SCR) device in the exhaust conduit downstream of the second LNT device, operably disposing a hydrocarbon oxidation catalyst device in the exhaust conduit downstream of the passive SCR device. The method also includes operably connecting a controller to the first electric heating device, the controller configured to execute a method of controlling the NOx emissions of the NOx generating internal combustion engine. The controller executing a method including monitoring a torque demand for the vehicle, determining if the torque demand is large enough to cause the internal combustion to generate NOx that exceeds a preselected threshold, operating the internal combustion engine at a reduced torque less than the torque demand, and operating the electric motor with the internal combustion engine to provide sufficient torque to satisfy the torque demand, wherein the reduced torque in addition to the sufficient torque equals the torque demand.

In addition to one or more of the features described above, or as an alternative, further embodiments may include a the controller executing a method further including determining if a regeneration of the first LNT device is required or in process, operating the internal combustion engine at a reduced preselected torque less than the torque demand, and operating the electric motor with the internal combustion engine to provide sufficient torque to satisfy the torque demand, wherein the reduced preselected torque in addition to the sufficient torque equals the torque demand.

In addition to one or more of the features described above, or as an alternative, further embodiments may include that the reduced preselected torque is based on at least one of an operating condition of the vehicle, an operating condition of the internal combustion engine, and the torque demand.

In addition to one or more of the features described above, or as an alternative, further embodiments may include that the reduced torque is based on at least one of an operating condition of the vehicle, an operating condition of the internal combustion engine, and the torque demand.

In addition to one or more of the features described above, or as an alternative, further embodiments may include facilitating regeneration of at least one of the first LNT device, the second LNT device, the passive SCR device and the hydrocarbon oxidation catalyst device with the first electric heating device.

In addition to one or more of the features described above, or as an alternative, further embodiments may include that the regeneration of the second LNT device is at a different temperature than the regeneration of the first LNT device.

In addition to one or more of the features described above, or as an alternative, further embodiments may include disposing a second electric heating device in the exhaust conduit and facilitating regeneration of at least one of the second LNT device, the SCR device, and the hydrocarbon oxidation catalyst device with the second electric heating device.

In addition to one or more of the features described above, or as an alternative, further embodiments may include at least one of the second LNT device, the passive SCR device, and the hydrocarbon oxidation catalyst device comprises a particulate matter filter.

In addition to one or more of the features described above, or as an alternative, further embodiments may include operably connecting a temperature sensor to the controller, the temperature sensor disposed in fluid communication with the exhaust gas.

In addition to one or more of the features described above, or as an alternative, further embodiments may include operably connecting a NOx sensor to the controller, the NOx sensor disposed in fluid communication with the exhaust gas.

In addition to one or more of the features described above, or as an alternative, further embodiments may include that the determining is based on at least one of a chemical model of the first LNT device, a chemical model of the second LNT device, and chemical model of the passive SCR device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely illustrative in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Described herein is a novel exhaust aftertreatment system architecture that includes an electrically heated Lean NOx Trap (LNT) coupled with a LNT on Filter (LNTF) innovative particulate filter. The system architecture also includes a passive Selective Catalytic Reduction (SCR) catalyst and a hydrocarbon (HC) catalyst. Additionally, an optional additional electrical heater may also be employed upstream of the filter in order to assist with the regeneration of the second LNT under selected conditions. In some embodiments the implementations employing additional heaters can be weighted in terms of added complexity and cost. Having two in line LNTs with different temperature window effectivities and efficiencies results in an increased NOx performance of the whole aftertreatment and exhaust system over a wide temperature range. An e-heated LNT will support the system during low-load operation and after a cold start, e.g., in the first 500 seconds after engine start, where the exhaust temperature is still too low for effective NOx conversion.

Advantageously, the assembly results in an entirely passive system, avoiding the requirement for reductant dosing, e.g., Diesel Exhaust Fluid (DEF) injection, as is conventional for diesel aftertreatment operation. The architecture of the described embodiments is optionally architected in an entirely closed coupled, integrated configuration, with innovative packaging, which would, among other things, take advantage of the higher engine output temperatures for better catalyst performance.

The described aftertreatment system employs an LNTF that offers simultaneous and continuous reduction of particulate matter (PM) as well as nitrogen oxides (NOx) emissions. The LNT coating in a particulate filter application works as with conventional systems in terms of NOx conversion. In addition, under lean operating conditions, PM is oxidized by active oxygen released in the NOx storage process and by excess oxygen in the exhaust gas. Under rich conditions, PM is also oxidized by the active oxygen that is released in the reduction process of stored NOx. Therefore, PM and NOx are reduced by controlling the air fuel ratio from lean to rich alternately.

It should be appreciated that electrically-heated LNT and LNTF technologies have been investigated previously in a variety of aftertreatment configurations (i.e., different aftertreatment layouts and components). Unfortunately, none have proven commercially successful due to various drawbacks, tradeoffs, and challenges exhibited by both technologies. However, advantageously, the disclosed configuration and methodologies facilitate implementation of ultralow emission combustion and electrification technologies that represent a viable option that brings benefits in terms of aftertreatment cost and packaging.

Figure 1:
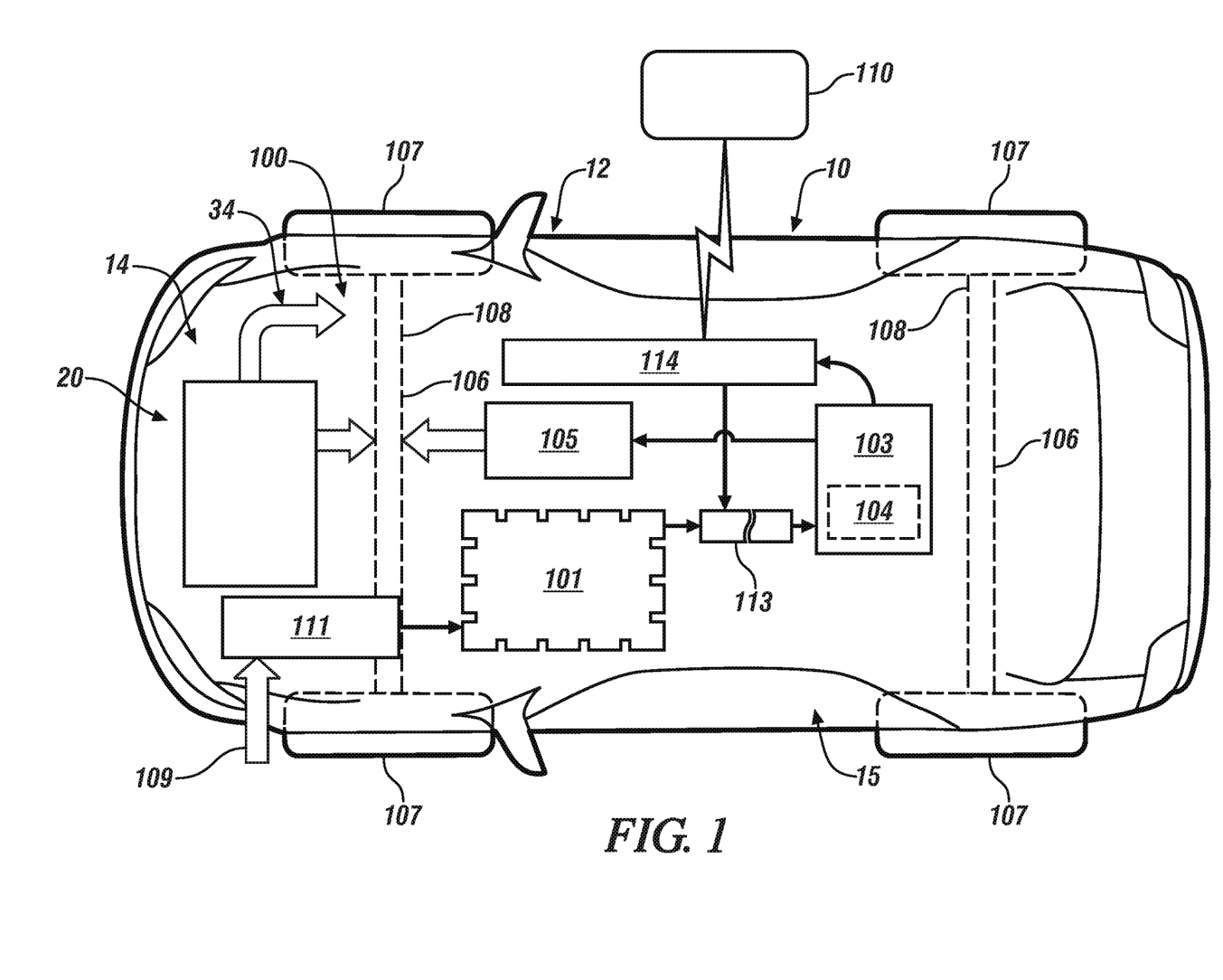
FIG. 1 depicts an electrified motor vehicle including an internal combustion engine and an emission control system according to one or more embodiments.

A motor vehicle, in accordance with an aspect of an embodiment, is indicated generally at 10 in FIG. 1. In particular, the vehicle 10 is a hybrid-electric vehicle, more specifically a diesel-electric hybrid vehicle 10. FIG. 1 is a vehicle schematic showing the components of the vehicle 10 of interest with the respect to the disclosed principles and the manner in which the components may be interrelated to execute those principles. It will be appreciated, however, that the illustrated architecture is merely an example, and that the disclosed principles do not require that the vehicle 10 be configured precisely as shown. It is to be understood that motor vehicle 10 may take on various forms including automobiles, commercial transports, marine vehicles, and the like. Motor vehicle 10 includes a body 12 and a passenger compartment 15. In some embodiments, the motor vehicle 10 may also include an engine compartment 14 that houses all or part of a propulsion system 100. In some embodiments, the engine compartment 14 houses an internal combustion engine system (ICE) shown generally as 20, which, in some instances may be part of a hybrid implementation of the propulsion system 100. Internal combustion engine system 20 may also include a transmission (not shown) mechanically coupled to a drive train 106. It should be noted that the technical solutions described herein are germane to ICE systems 20 and can include, but are not limited to, diesel engine systems and gasoline engine systems. The ICE system 20 can include a plurality of reciprocating pistons attached to a crankshaft, which may be operably attached to a driveline, such as a vehicle driveline, to power a vehicle (e.g., deliver tractive torque to the driveline). For example, the ICE system 20 can be any engine configuration or application, including various vehicular applications (e.g., automotive, marine and the like), as well as various non-vehicular applications (e.g., pumps, generators and the like). ICE system 20 includes an exhaust system 30 (FIG. 2) that is fluidically connected to an aftertreatment or emissions control system 34. Exhaust produced by ICE system 20 passes through emissions control system 34 to reduce emissions that may exit to ambient through an exhaust outlet pipe (not shown).

While the ICE system 20 may be described in a vehicular context (e.g., generating torque), other non-vehicular applications are within the scope of this disclosure. Therefore, when reference is made to a vehicle, such disclosure should be interpreted as applicable to any application of an ICE system 20. Moreover, an ICE system 20 can generally represent any device capable of generating an exhaust gas stream comprising gaseous (e.g., NOx, O2), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more NOx species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE system 20 can also generally represent any device capable of generating an effluent stream comprising such species. Exhaust gas particulate matter generally includes carbonaceous soot, and other solid and/or liquid carbon-containing species which are germane to ICE system 20 exhaust gas or form within an emissions control system 34.

In other embodiments, the ICE system 20 may be configured to provide power to an electric drive system in a hybrid configuration. For example, in one embodiment, the ICE system 20 provides electric power to operate an electric propulsion system 100. In some embodiments, the propulsion system 100 and ICE system 20 may be mechanically coupled to driveline 106 to power the vehicle 10 (e.g., deliver tractive torque to the driveline 106).

Moreover, an ICE system 20 can generally represent any device capable of generating an exhaust gas stream comprising gaseous (e.g., NOx, O2), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more NOx species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE system 20 can also generally represent any device capable of generating an effluent stream comprising such species. Exhaust gas particulate matter generally includes carbonaceous soot, and other solid and/or liquid carbon-containing species which are germane to ICE system 20 exhaust gas or form within an emissions control system 34.

Continuing with FIG. 1, in the illustrated example, the vehicle 10 and propulsion system 100 includes an electrical energy storage system 101, (e.g., a battery or battery bank ("battery")) of suitable voltage and capacity. Suitable battery types include but are not limited to lead acid batteries, Nickel Cadmium batteries (NiCd), Nickel Metal Hydride batteries (NiMH), Lithium Ion batteries, and Lithium Polymer batteries. The electrical energy storage system 101 is conductively linked, e.g., via a motor controller 103, to an electrical drive unit 105, e.g., an electrical motor or motors, (hereinafter electric motor 105). It will be appreciated that the electric power from the electrical energy storage system 101 may be modulated, voltage-modified, or otherwise modified by the motor controller 103 (or other devices) as needed to drive the electric motor 105. In some embodiments the motor controller 103 may include a motor drive system 104. In other embodiments, a separate motor drive system 104 may be employed. Typically a motor drive system 104 may include a voltage converter, inverter, and selecting transient filtering as is generally employed. The electric motor 105 is linked or linkable to a ground engaging drive, typically including one or more wheels 107. In some embodiments the electric motor 105 is a single electric motor operably connected to driveline 106, in others, multiple electric motors 105 may be employed to drive an axle or wheel 107 of the vehicle 10. For ease of illustration, a single motor 105 is depicted coupled to a single axle 108, but a variety of configurations are possible.

In one optional implementation, a plug interface 109 may be provided in order to charge the electrical energy storage system 101, although it will be appreciated that the teachings herein apply beyond vehicles having plug-in architectures as well. The plug interface allows the propulsion system 100 and motor drive system 104 to interface with a source of AC/DC power, such as an electrical main line, (e.g., 115/230 volt AC. e.g., via plug interface 109), power bus, DC power bus, (e.g., battery 101), and the like. The plug interface 109 is linked to the electrical energy storage system 101 via a charge controller 111. An optional aspect of the vehicle 10 and electrical energy storage system 101 is the ability to electrically disconnect the electrical energy storage system 101 from the rest of the vehicle 10 by controlling at least one, and preferably two or more, high voltage contactors 113 if an adverse condition is detected. A communications interface 114 may also be employed and may be adapted to receive information from the charge controller 111, or motor controller 103 and to convey data regarding the vehicle 10, propulsion system 100 and the battery 101 to a remote system 110. In another embodiment the motor controller 103, and the charge controller 111 may be integrated with a control module 260 (FIG. 2) for the emission control system 34. In addition one or all of the controllers 111, 103, or control module 260 may further include control functions for controlling the operation of the vehicle 10. In an embodiment, motor controller 103 provides functionality for controlling vehicle 10 and propulsion system 100 functionality. In an embodiment the remote system 110 may be a server configured to receive vehicle status, maintenance, or fault information and the like. For example, in one embodiment the communications interface 114 provides engine status, state of charge and state of health information associated with the electrical energy storage system 101 to the remote system 110. The propulsion system 100 as described is described with respect to a power system for a motor vehicle 10, however application to any system where control of a motor drive system 104 is employed may be envisioned.

Figure 2:
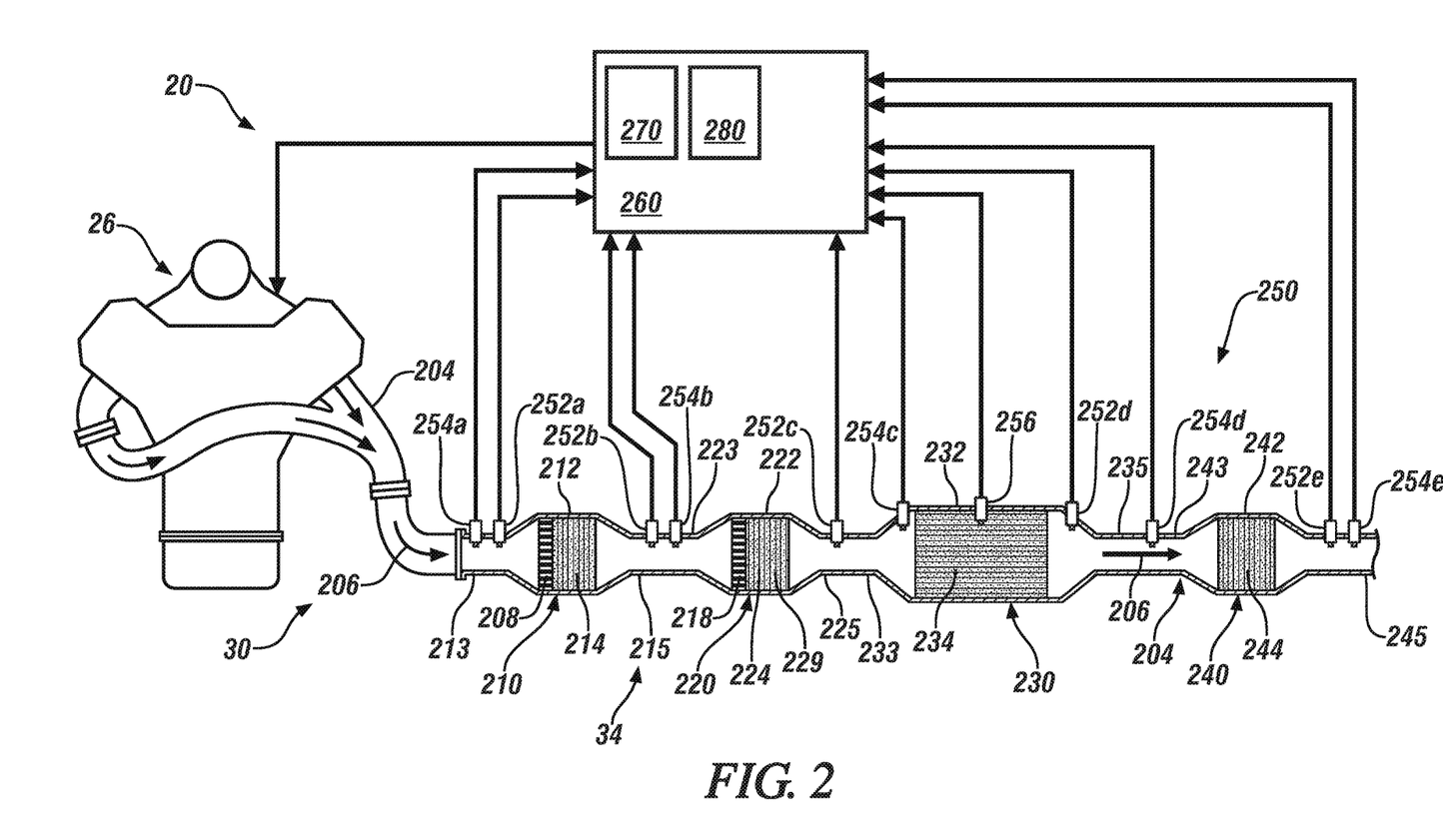
FIG. 2 illustrates example components of an emissions control system according to one or more embodiments.

FIG. 2 illustrates example components of the emissions control system 34 according to one or more embodiments. It should be noted that while the ICE system 20 includes a diesel engine 26 in the above example, the emissions control system 34 described herein can be implemented in various engine systems, more particularly, any NOx generating internal combustion engine. The emissions control system 34 facilitates the control and monitoring of NOx storage and/or treatment materials, to control exhaust produced by the ICE system 20. For example, the technical solutions herein provide methods for controlling electric heaters. Lean NOx Trap (LNT) devices, selective catalytic reduction (SCR) devices, and appurtenant NOx, temperature, and pressure sensors, wherein the LNT devices, SCR devices are configured to receive exhaust gas streams from an exhaust gas source. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. SCR devices are configured to receive reductant, such as at variable dosing rates as will be described below.

Continuing with FIG. 2, an exhaust gas conduit 204, which may comprise several segments, transports exhaust gas 206 from the diesel engine 26 to the various exhaust treatment devices of the emissions control system 34. For example, as illustrated, the emission control system 34 includes a series combination of a first heating device 208, with a first LNT device 210. An optional second heating device 218 is employed in advance of a second LNT device 220 which then directs exhaust gases to a passive SCR device 230. In one or more examples, the second LNT device 220 can include a selective catalytic filter (SCRF) device, which provides the catalytic aspects of SCRs in addition to particulate filtering capabilities. In one or more examples, the SCR device 230 can include a selective catalytic filter (SCRF) device, which provides the catalytic aspects of SCRs in addition to particulate filtering capabilities. The emission control system 34 can include various additional treatment devices, including a diesel oxidation catalyst (DOC) device 240, and additional particulate filter devices (not shown), among others.

Continuing with FIG. 2, the first heating device 208 is disposed in the stream of exhaust gas 206 upstream of the first LNT device 210. In an embodiment the first heating device 208 and the first LNT device 210 is disposed in a housing 212 that substantially encloses the first heating device 208 and the substrate 214 of the first LNT 210. The substrate 224 may be made of metal, however other materials are possible. The housing 212 may be generally cylindrical or have any other shape that permits the flow of exhaust gas 206 from an inlet 213 to an outlet 215 and through the substrate 214. The inlet 213 provides the fluid passageway for the flow of exhaust gas 206 into the first heating device 208 and first LNT device 210, and the outlet 215 provides the fluid passageway for the flow of exhaust gas 206 out of the substrate device 214.

Figure 3A:
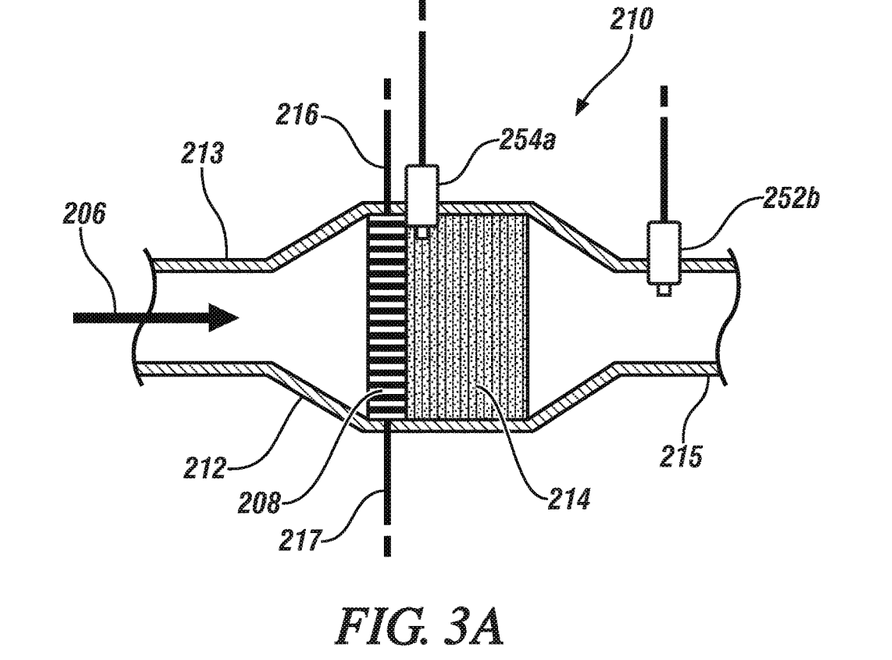
FIG. 3A depicts a simplified expanded cutaway view of a first LNT device with integral electric heater according to one or more embodiments.
Figure 3B:
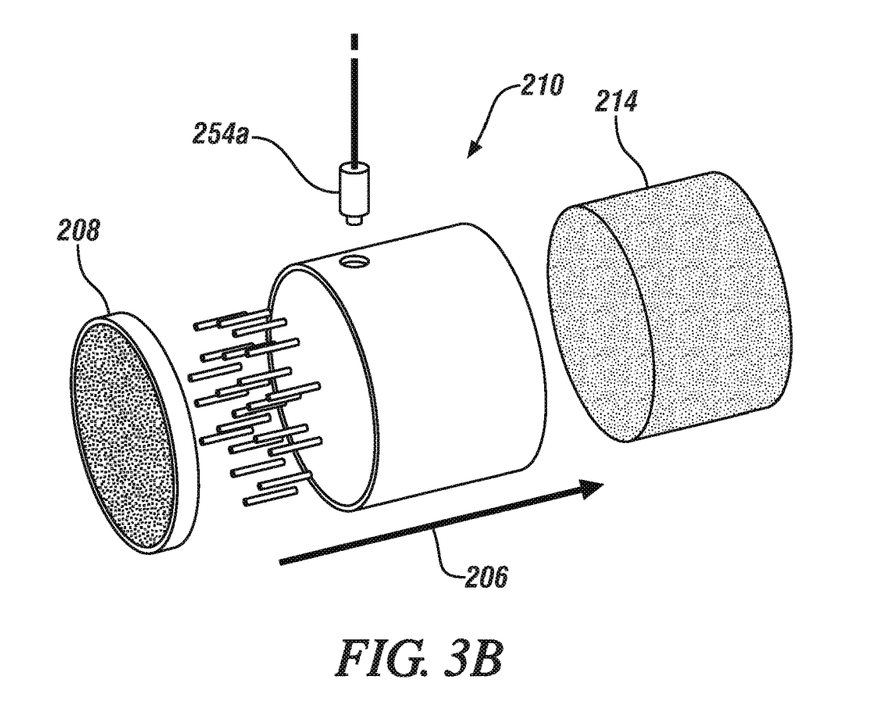
FIG. 3B depicts a simplified sectional perspective view of a first LNT device with integral electric heater according to one or more embodiments.

Turning now to FIGS. 3A and 3B, with continuing reference to FIG. 2, the first LNT device 210 has a first electrode 216 that is electrically connected to a power source on the vehicle 10, with a first transmission wire (not shown). The first electrode 216 extends through the housing 212 of the first LNT device 210 and contacts the first heating device 208. A second electrode 217 extends from the housing 212 of the first LNT device 210 and is also electrically connected, as needed, to complete the electrical circuit in a conventional manner. While the second electrode 217 extends from the housing 212, it is also possible that the second electrode 217 may contact the first heating device 208 generally opposite the first electrode 216. When current is run to the first electrode 216, the current is isolated from the housing 212 and the current is directed to the first heating device 208 of the first LNT device 210 exiting at the second electrode 217. In an embodiment the electrodes 216, 217 and portions of the heating device 208 may be a portion of the first LNT device 210. In another embodiment the first heating device 208 is a separate heating device from the substrate 214 of the first LNT device 210. It is also possible that the heating device 208 may be all or a portion of the substrate 214 configured to generate heat with the application of an electrical current. It is possible that the selective introduction of current into the first LNT device 210 can be at the activation of a user or an automatic activation, such as by an engine control 103, or emission control system 34, including control module 260.

When the current flows through the first heating element 208, heat is generated in the first LNT device 210. The exhaust gases 206 that flow through the first LNT device 210 are heated by the heating device 208 and the heated exhaust gases 206 flow to/through the substrate 214. The first heating device 208 provides sufficient heat to the exhaust gases 206 to initiate efficient reaction in the substrate 214 as needed and regeneration of the filter media as described herein. Moreover, electrically heating the exhaust gases 206 facilitates regeneration of the first LNT device 210 by ensuring more desirable temperatures for regeneration.

In operation, the first heating device 208 is controlled by a control module 260. In an embodiment, the control module 260 executes a method that monitors the operation of the ICE system 20 and, specifically, the temperatures and NOx content of the exhaust gases 206. The first heating device 208 is employed to provide heating to the exhaust gases 206 to ensure the reaction with the catalyst on the substrate 214 as described herein. In addition, the control module 260 may further employ the first heating device 208 for additional applications including aiding in regeneration of the catalyst on the substrate 214 of the first LNT device 210 and/or the second LNT/LNTF device 220. Finally, it should be appreciated that while the main function of the first heating device 208 is aftertreatment warmup, (e.g., getting the emission control system 34 components to operating temperature, particularly at startup), the first heating device 208 also provides the emission control system 34 with the capability to increase the temperature after light-off of the first LNT device 210 to perform purge/regeneration in a more efficient temperature window both for NOx conversion and NH3 generation.

As can be appreciated, the first LNT device 210 can be of various flow-through, adsorbing catalyst devices known in the art. In various embodiments the first LNT device 210 may include a flow-through metal or ceramic monolith substrate 214. The substrate 214 may be packaged in the shell or canister forming a housing 212 as described above and in fluid communication with the exhaust gas 206 in the exhaust gas conduit 204. The substrate 214 may include a NOx adsorbing compound disposed thereon. The NOx adsorbing compound may be applied as a washcoat and may contain zeolites, alkali/alkaline oxide (carbonate), or combination and compounds thereof. The first LNT device 210 is useful in storing and treating the nitrogen oxides present in the exhaust gas 206. Under lean operating conditions, the NOx is accumulated or "trapped" in the substrate 214 of the LNT device 210, 220. The trapped NOx is periodically released or "purged" by operating at a stoichiometric or rich air fuel ratio. The released NOx is reduced to N2 by reductants present in the exhaust gas 206 such as CO and H2. The possible reaction mechanisms during the storage and purging phases of the LNT devices 210, 220 are well known. Under lean conditions, NO is oxidized to NO2 in the gas phase over platinum. The resulting NO2 is adsorbed on an oxide surface as a nitrate, (e.g., as barium nitrate for a barium adsorbent). Typical adsorbents for the substrate of the LNT include oxides of potassium, calcium, cerium, zirconium, lanthanum, and barium.

The sequence of steps and reactions is:

Nitrate Decomposition: $Ba(NO_3)+2CO \rightarrow NO+2CO_2$

NO Conversion: $2NO+2CO \rightarrow N_2+2CO_2$

At rich air fuel ratios for the ICE 20, the adsorbed barium nitrate is released from the LNT device (e.g. 210, 220) as barium oxide. In the presence of reducing agents (also in the exhaust gas 206), such as CO, HC and H2 and Pt/Rh catalyst, the NOx is converted to nitrogen and the trapping constituent, barium carbonate is restored yielding H2, CO2 H2O and NH3.

The sequence of steps for part to the remaining reactions are:

$CO+H_2O \rightarrow CO_2+H_2$ $5H_2+2NO \rightarrow 2NH_3+2H_2O$ $HC+H_2O \rightarrow CO+3/2H_2$ Advantageously, the NH3 is directed into the remaining exhaust gas 206 and to the SCR device 230 where it is captured, stored, and employed as a reductant therein for further NOx reduction as is discussed further herein. It should also be appreciated that sulfur present in the fuel acts as a poisoning agent. That is, in the combustion process, the sulfur is oxidized to sulfur dioxide (SO2). The sulfur dioxide is oxidized to sulfur trioxide in the presence of platinum. The sulfur oxide is trapped as barium sulfate at the trap operating conditions. As a result, the NOx trapping efficiency of the LNT device 210 is a function of trap temperature, catalyst loading, fuel sulfur content, space velocity, feed gas concentration, and trap regeneration frequency. It has also been noted that using a richer A/F ratio for purging allows the LNT device(s) 210, 220 to be run lean for a longer period of time. But, purging at a richer A/F ratio not only has a larger impact on fuel economy but also increases the likelihood of converting the trapped sulfate to undesirable hydrogen sulfide, which must also be addressed and not released. It is clear that in order to improve fuel economy and minimize NOx emissions, the storage/purge control strategy for the LNT device(s) 210, 220 needs to be well designed and optimized.

A washcoat layer includes a compositionally distinct layer of material disposed on the surface of the monolithic substrate 214 or an underlying washcoat layer. A catalyst can contain one or more washcoat layers, and each washcoat layer can have unique chemical catalytic functions. In the first LNT device 210, the catalyst compositions for the nitrogen storage function can reside in discrete washcoat layers on the substrate 214 or, alternatively, the compositions for the first LNT device 210 and NOx storage functions can reside in discrete longitudinal zones on the substrate 214.

The substrate 214 body for the first LNT device 210 can, for example, be a ceramic brick, a plate structure, or any other suitable structure such as a monolithic honeycomb structure that includes several hundred to several hundred parallel flow-through cells per square inch, although other configurations are suitable. Each of the flow-through cells can be defined by a wall surface on which the catalyst composition can be washcoated. The substrate 214 body can be formed from a material capable of withstanding the temperatures and chemical environment associated with the exhaust gas 206. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating TiO2 material, for example. The substrate body can also function as a particle filter as will be discussed below.

The LNTF catalyst compositions are generally a porous and high surface area material which can operate efficiently to adsorb and store NOx constituents of the exhaust gas 206. Suitable LNT catalyst compositions can have high thermal structural stability, particularly when used in tandem with particulate filter (PF) devices or when incorporated into LNTF devices, which are regenerated via high temperature exhaust soot burning techniques. The LNT catalyst composition can optionally further comprise one or more base metal oxides as promoters to further decrease the SO3 formation and to extend catalyst life. The one or more base metal oxides can include WO3, Al2O3, and MoO3, in some embodiments. In one embodiment, WO3, Al2O3, and MoO3 can be used in combination with V2O5.

Continuing with FIG. 2, following the first heating device 208 and the first LNT 210, the exhaust gas 206 is directed to the optional second heating device 218, which is disposed in the stream of exhaust gas 206 upstream of the second LNT device 220. In an embodiment the optional second heating device 218 and the second LNT device 220 are disposed in the housing 222. The second LNT device 220 operates in a similar fashion as the first LNT device 210 described herein. As a result, further discussion of the operation of the second LNT device 220 where it is similar to the first LNT device 210 is omitted for brevity.

In an embodiment, the second LNT device 220 is also an LNT on filter, also denoted as an LNTF an denoted by references numeral 220. In at least one embodiment, the filter portion 229 of the substrate 224 is formed as a particulate filter (PF), such as a diesel particulate filter (DPF). As identified earlier, the substrate 224 of the second LNT/LNTF device 220 may be made of metal, however other materials are possible. Housing 222 may be generally cylindrical or have any other shape that permits the flow of exhaust gas 206 from an inlet 223 to an outlet 225 and through the substrate 224. The inlet 223 provides the fluid passageway for the flow of exhaust gas 206 into the optional second heating device 218 and second LNT/LNTF device 220, and the outlet 225 provides the fluid passageway for the flow of exhaust gas 206 out of the substrate device 224. The filter portion 229 (i.e., the PF) of the substrate 224 may be constructed, for example, using a ceramic wall flow monolithic exhaust gas filter substrate, which is configured to filter or trap carbon and other particulate matter from the exhaust gas 206. It is appreciated that a ceramic wall flow monolith filter substrate is merely exemplary in nature and that the filter portion 229 of substrate 224 may include other filter devices such as wound or packed fiber filters, open cell foams, sintered metal fibers, etc. The emissions control system 34 may also perform a regeneration process that regenerates the substrate 224 by burning off the particulate matter trapped in the filter portion 229 of the substrate 224, in one or more examples.

Figure 4A:
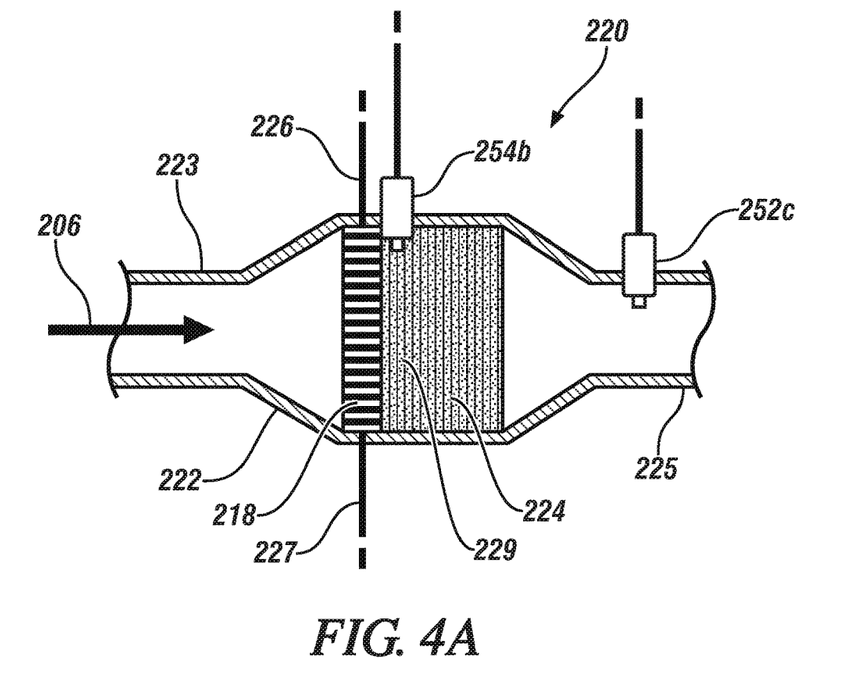
FIG. 4A depicts a simplified expanded cutaway view of a second LNT/LNTF device with integral electric heater according to one or more embodiments.
Figure 4B:
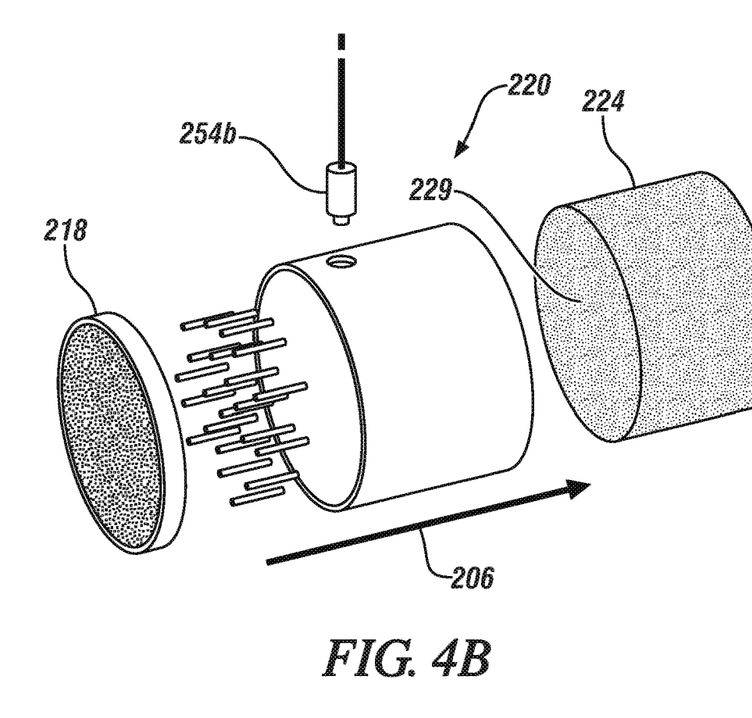
FIG. 4B depicts a simplified sectional perspective view of a second LNT/LNTF device with integral electric heater according to one or more embodiments.

Turning now to FIGS. 4A and 4B as well, once again, a first electrode 226 of the second heating device 218 is electrically connected to a power source on the vehicle 10, with a first transmission wire (not shown). The first electrode 226 extends through the housing 222 of the second LNT/LNTF device 220 and contacts the second heating device 218. A second electrode 227 extends from the housing 222 of the second LNT/LNTF device 220 and is also electrically connected as needed to complete the electrical circuit in a conventional manner. While the second electrode 227 extends from the housing 222, it is also possible that the second electrode 227 may contact the second heating device 218 generally opposite the first electrode 226. When current is run to the first electrode 226, the current is isolated from the housing 222 and the current is directed to the second heating device 218 of the second LNT/LNTF device 220 exiting at the second electrode 227. As described herein, for the first heating device 208 and first LNT device 210, in an embodiment the electrodes 226, 227 and all or portion of the second heating device 218 may be a portion of the second LNT/LNTF device 220. In another embodiment the second heating device 218 is a separate heating device from the substrate 224 of the second LNT/LNTF device 220. It is also possible that the heating device 208 be all or a portion of the substrate 224 configured to generate heat with the application of an electrical current. Once again, it is possible that the selective introduction of current into the second LNT/LNTF device 220 can be at the activation of a user or an automatic activation, such as by an engine control or emission control system 34.

When the current flows through the second heating device 218, heat is generated in the second LNT/LNTF device 220. The exhaust gases 206 that flow through the second LNT/LNTF device 220 are heated by the second heating device 218 and the heated exhaust gases 206 flow to/through the substrate 224. The second heating device 218 provides sufficient heat to the exhaust gases 206 to initiate efficient reaction of the catalyst on the substrate 224 as needed and regeneration of the filter media as described herein. Moreover, electrically heating the exhaust gases 206, ensures more desirable temperatures for regeneration of the second LNT/LNTF device 220 as well as purge for the particulate filter (e.g., 229) aspects of the second LNF/LNTF device 220.

Continuing with FIG. 2, in operation, the second heating device 218 is also controlled by the control module 260. In an embodiment, the control module 260 executes a method that monitors the operation of the ICE system 20 and specifically the temperatures and NOx content of the exhaust gases 206. The optional second heating device 218 is employed to provide further heating of the exhaust gases 206 to ensures the reaction described herein. In addition, the control module 260 may further employ the optional second heating device 218 for additional applications including aiding in regeneration of the catalyst on the substrate 224 of the second LNT/LNTF device 220. Finally, it should be appreciated that while the main function of the second heating device 218 is aftertreatment warmup e.g., getting/maintaining the emission control system components and particularly the second LNT/LNTF device 220 to operating temperature, particularly at startup, the second heating device 218 also provides the emission control system 34 with the capability to increase the temperature after light-off of the second LNT/LNTF device 220 to perform regeneration both for NOx conversion and NH3 generation in a more efficient temperature window via rich operating conditions of the ICE system 20. Furthermore, in a filtering configuration, the second heating device 218 also operates to burn/purge particulate matter off the filter portion 229 of the substrate 224 employing high temperature burn cycles.

It should also be appreciated that while emission control system 34, as depicted in FIG. 2, is described with the first electric heating device 208 located upstream of the first LNT device 210, it is possible that if the exhaust gas 206 achieves a sufficient exhaust gas temperature, that the emission control system 34 may include only a single LNT device 210 with or without the integral first heating device 208 and substrate/catalyst 214, and no downstream e.g., second heating device 218 or second LNT/LNTF device 220. Likewise, while two heating devices are described, it is possible that more than to heating devices may be employed, as needed, to increase the temperature of the exhaust gas 206 and ensure efficient operation of the emission control system 34.

Continuing with FIG. 2, after exiting the second LNT/LNTF device 220, the exhaust gases 206 are then directed to an SCR device 230. The SCR device 230 can include, for example, a flow-through ceramic or metal monolith substrate 234 that can be packaged in a shell or canister 232 having an inlet 233 and an outlet 235 in fluid communication with the exhaust gas conduit 204 and optionally other exhaust treatment devices, e.g., the first LNT device 210, the second LNT/LNTF device 220, and the like. The shell or canister 232 can ideally comprise a substantially inert material, relative to the exhaust gas constituents, such as stainless steel. The substrate 234 includes an SCR catalyst composition applied thereto.

The substrate 234 can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the catalyst composition can be washcoated. The substrate 234 body can be formed from a material capable of withstanding the temperatures and chemical environment associated with the exhaust gas 206. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can also function as a particle filter as will be discussed below.

The SCR catalyst compositions are generally a porous and high surface area material which can operate efficiently to convert NOx constituents in the exhaust gas 206 in the presence of a reductant such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments, the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques. The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR device 230 may be disposed downstream from the first LNT device 210 and second LNT/LNTF device 220.

In an embodiment, the SCR device 230 is a passive device. In one or more examples, the SCR device 230 receives and stores reductant, i.e., NH₃ released by the first LNT device 210 or second LNF/LNTF device 220 that are present in the exhaust gases 206. The catalyst containing washcoat disposed on the substrate 234 stores the NH3 in the exhaust gases 206 to reduce NOx constituents therein. The SCR device 230 utilizes the excess ammonia (NH₃), to further react with any remaining NOx in the exhaust gases 206 that have passed the first LNT 210 or the second LNT/LNTF device 220 (i.e., NOx slip).

The SCR device 230 includes an SCR catalyst that generally uses a reductant, e.g., excess NH3 or NH3 compounds emitted from the first LNT device 210 or second LNT device 220 to reduce NOx species (e.g., NO and NO2) to unregulated emission components. Such components include one or more of species which are not NOx species, such as diatomic nitrogen, nitrogen-containing inert species, or species which are considered acceptable emissions, for example. It should be appreciated that in an embodiment the reductant is typically ammonia (NH3) as that is emitted by the first LNT device 210 and second LNT/LNTF device 220, but may also be any compound generated by the first LNT device 210 or second LNT device 220 capable of decomposing or reacting in the presence of exhaust gas 206 and/or heat with NOx. Equations (1)-(5) provide exemplary chemical reactions for NOx reduction involving ammonia.

$$6NO+4NH3 \rightarrow 5N2+6H2O \quad (1)$$

$$4NO+4NH3+O2 \rightarrow 4N2+6H2O \quad (2)$$

$$6NO2+8NH3 \rightarrow 7N2+12H2O \quad (3)$$

$$2NO2+4NH3+O2 \rightarrow 3N2+6H2O \quad (4)$$

$$NO+NO2+2NH3 \rightarrow 2N2+3H2O \quad (5)$$

It should be appreciated that Equations (1)-(5) are merely illustrative, and are not meant to confine the SCR device 230 to a particular NOx reduction mechanism or mechanisms, nor preclude the operation of other mechanisms. The SCR device 230 can be configured to perform any one of the above NOx reduction reactions, combinations of the above NOx reduction reactions, and other NOx reduction reactions. Typically, an active SCR device is employed with injected reductant into the exhaust gases. The injected reductant stored in the SCR device and reacting with the NOx in the exhaust gases. In the described embodiments a passive SCR device 230 is employed. The passive SCR device 230 stores reductants that are in the exhaust gases 206 resulting from the reactions in the first LNT device 210 or second LNT/LNTF device 220.

The SCR catalyst can store (i.e., absorb, and/or adsorb) NH3 for interaction with exhaust gas 206. A given SCR device 230 has a reductant capacity, or an amount of reductant or reductant derivative it is capable of storing. The amount of reductant actually stored within an SCR device 230, relative to its reductant storage capacity is commonly be referred to as the SCR "reductant loading", and can be indicated as a % loading (e.g., 90% reductant loading). During operation of SCR device 230, reductant is stored by the catalyst of the SCR device 230, and is consumed during reduction reactions with NOx species, requiring continual replenishment. The replenishment results from the reactions in the first LNT device 210 and/or second LNT/LNTF device 220. Controlling the operation of the first LNT device 210 and/or second LNT/LNTF device 220 ensures maintaining sufficient reductant storage levels in the SCR device 230 to facilitate maintaining exhaust gas emissions at acceptable levels. As mentioned previously, insufficient reductant storage levels in the SCR device 230 can result in NOx breakthrough, while excessive reductant passing through the SCR device 230 results in reductant slip.

Continuing with FIG. 2, the exhaust gases 206 exiting the SCR device 230 may then be directed to the hydrocarbon catalyst (OC/DOC) device 240, that once again also optionally includes a particulate filter device (not shown). As can be appreciated, the DOC device 240 can be of various flow-through, oxidation catalyst devices known in the art. In various embodiments the DOC device 240 may include a flow-through metal or ceramic monolith substrate 244. The substrate 244 may be packaged in a stainless steel shell or canister 242 having an inlet 243 and an outlet 245 in fluid communication with the exhaust gas conduit 204. The substrate 244 includes an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The DOC device 240 is useful in treating unburned gaseous and non-volatile HC and CO, which are oxidized to form carbon dioxide and water. A washcoat layer includes a compositionally distinct layer of material disposed on the surface of the monolithic substrate 244 or an underlying washcoat layer. A catalyst can contain one or more washcoat layers, and each washcoat layer can have unique chemical catalytic functions. In the DOC device 240, the catalyst compositions for the oxidation function can reside in discrete washcoat layers on the substrate 244 or, alternatively, the compositions for hydrocarbon oxidation functions can reside in discrete longitudinal zones on the substrate 244.

In one or more examples, the emissions control system 34 further includes the control module 260 operably connected via a number of sensors to monitor the engine 26 and/or the exhaust gas emission control system 34. For example, control module 260 can execute control process as described herein for overall emission control including NOx reduction and hydrocarbon oxidation including regeneration of the substrates 214, 224, 234, and 244 respectfully. The control module 260 can be operably connected to ICE system 20, first LNT device 210, second LNT/LNTF devices 220, SCR device 230, HC/DOC device 240, through one or more sensors 250. In an embodiment, the control module 260 is a portion of the controller 111 or motor controller 103 (FIG. 1). In another embodiment, the control module 260 may be a stand-alone component. As shown, the sensors, shown generally as 250, may include a first NOx sensor 252a disposed upstream of the first LNT device 210, a second NOx sensor 252b, disposed upstream of second LNT/LNTF device 220, and a third NOx sensor 252c disposed upstream of the SCR device 230. In addition a fourth NOx sensor 252d is employed downstream in the exhaust gases 206 of the SCR device 230. Finally, a fifth NOx sensor 252e may be employed downstream of the HC oxidization device/DOC device 240. Each of the NOx sensors 252a, 252b, 252c, 252d, and 252e are in fluid communication with exhaust gas 206 in the exhaust gas conduit 204. The NOx sensors 252a-e detect NOx levels proximate their locations and generate NOx signals, which correspond to the NOx levels detected. A NOx level can comprise a concentration, a mass flow rate, or a volumetric flow rate, in some embodiments. A NOx signal generated by a NOx sensors 252a-e are transmitted to the control module 260 and can be interpreted by control module 260 as needed for operation of the emission control system 34.

In addition, the control module 260 can optionally be in communication with one or more temperature sensors, such as a first temperature sensor 254a, disposed upstream from first LNT device 210. A second temperature sensor 254b, is disposed upstream of the second LNT/LNTF device 220, while a third temperature sensor 254c is disposed upstream of the SCR device 230. In addition a fourth temperature sensor 254d is disposed downstream of the SCR device 230. Finally, a fifth temperature sensor 254e is disposed downstream of the HC oxidation/DOC device 240. Each of the temperature sensors 254a, 254b, 254c, 254d, and 254e are in fluid communication with exhaust gas 206 in the exhaust gas conduit 204. The temperature sensors 254a-e detect temperatures proximate their locations and generate temperature signals, which correspond to the temperatures measured. A temperature signal generated by a temperature sensors 254a-e are transmitted to the control module 260 and can be interpreted by control module 260 as needed for operation of the emission control system 34.

The sensors of the emissions control system 34 may further include at least one pressure sensor 256 (e.g., a delta pressure sensor). The delta pressure sensor 256 may determine the pressure differential (i.e., Δp) across the second LNT/LNTF device 220 or SCR device 230 depending on the configuration of the emission control system 34. Generally, pressure sensors 256 are employed on the device providing particulate filtering. In an embodiment, the pressure sensor are depicted on the SCR device 230 although the description is equally applicable to the second LNT/LNTF device 220. Moreover, although a single delta pressure sensor 256 is illustrated, it is appreciated that a plurality of pressure sensors may be used to determine the pressure differential of the SCR device 230. For example, a first pressure sensor (not shown) may be disposed at the inlet 233 of the SCR device 230 and a second pressure sensor (also not shown) may be disposed at the outlet 235 of the SCR device 230. Accordingly, the difference between the pressure detected by the second pressure sensor and the pressure detected by the first pressure sensor may indicate the pressure differential across the SCR device 230. It should be noted that while, NOx, temperature, and pressure sensors have been described as an example, the sensors 250 can include different, additional, or fewer sensors than those illustrated/described herein. Other possible sensors include addition pressure sensors, flow rate sensors, particulate matter sensors, and the like.

In an embodiment the control module may execute an SCR chemical model 270 which, among other things, predicts the amount of reductant stored in the SCR device 230 based on signals from one or more of the first NOx (e.g., NOx signal from upstream NOx sensor 252a also denoted as $NO_{x1}$). The SCR chemical model 270 further predicts NOx levels of exhaust gas 206 discharged from the SCR device 230. Likewise, the SCR chemical model 270 may also predict the NOx level of exhaust gas 206 discharged and exhausted to the atmosphere. The SCR chemical model 270 can be implemented by control module 260. The SCR chemical model 270 can be updatable by one or more process values over time. Control module 260, monitors the reductant storage level predicted by the SCR chemical model 270, and compares the same to a desired reductant storage level based on conditions of the exhaust gas 206 exiting the second LNT/LNTF device 220 and SCR device 230 respectively. Deviations between the predicted reductant storage level and the desired reductant storage level can be continuously monitored and employed to make corrections in the emission control system 34 and operation of the first LNT device 210 and second LNT/LNTF device 220 to maintain or optimize reductant (NH3 generation in the first LNT device 210 and/or second LNT/LNTF device 220) in a manner that provides for optimal operation of the passive SCR device 230. A desired conversion rate can be determined by many factors, such as the characteristics of SCR catalyst type and/or operating conditions of the system (e.g., ICE system 20 operating parameters, first LNT device 210 characteristics, second LNT/LNTF device 220 characteristics).

In an embodiment the control module 260 may also execute one or more LNT chemical model(s) 280 corresponding to the first LNT device 210 and/or second LNT/LNTF device 220, which, among other things, predicts the amount of NOx stored in the first LNT device 210 and/or second LNT/LNTF device 220. The predicted stored NOx is based on signals from one or more of the first NOx sensor (e.g., NOx signal from upstream NOx sensor 252a) and first temperature sensor 254a. The LNT chemical model 280 further predicts NOx levels of exhaust gas 206 discharged from the first LNT device 210 and second LNT/LNTF device 220. The predicted stored NOx is based on signals from one or more of the second NOx sensor (e.g., NOx signal from NOx sensor 252b, 252c) and temperature sensors 254b, 254c. Likewise, the LNT chemical model 280 may also predict the NOx level of exhaust gas 206 discharged and exhausted to the atmosphere. The LNT chemical model 280 can be updatable by one or more process values over time.

Control module 260, monitors the NOx level predicted by the LNT chemical model 280 and commands the emission control system 34 to execute regeneration or purge request for the first LNT device 210 and/or second LNT/LNTF device 220 when the predicted NOx storage levels exceed a selected threshold. In an embodiment the selected threshold is 75% of the storage capacity for the LNT device (e.g., the first LNT device 210 or the second LNT/LNTF device 220). The stored NOx levels are both predicted by the LNT chemical model 280 and measured by monitoring the various NOx sensor 252a-e. A "DeNOx" event or regeneration of the first LNT device 210 and/or second LNT/LNTF device 220 entails operating the ICE system 20 in a fuel rich condition for a selected duration. In an embodiment, a fuel rich condition means an air/fuel ratio of less than one. More particularly, in an embodiment an air/fuel ratio of 0.95 is employed. In an embodiment, an existing oxygen sensor is employed upstream of the LNT devices 210, 220 to monitor fuel ratio of the ICE system 20. In other embodiments, air/fuel ratio may be predicted by a model as part of the control of the ICE system 20. In another embodiment the selected duration is about ten seconds, though other durations are possible. The selected duration is based on temperature, the construction and characteristics of the LNT substrate 214, 224, the NOx storage in the LNT devices 210, 220, the velocity of the exhaust gases 206, and the stability of the combustion.

In addition the NOx storage is also dependent on the operating temperature of the first LNT device 210 and/or the second LNT/LNTF device 220. It will be appreciated that for the regeneration to be effective, it is desirable to maintain the ICE system 20 in a stabilized state. In particular, to ensure that the exhaust gases 206, and their content, temperature, are at steady state. As discussed herein, variations in torque demand for the ICE result in significant variations in NOx production. Such variations make regeneration difficult, and more specifically, difficult to quantify the effectiveness of the regeneration. To that end, two processes are employed to facilitate the regeneration of the first LNT device 210 or the second LNT/LNTF device 220. First, the temperatures of the first LNT device 210 and/or the second LNT/LNTF device 220 are maintained at a steady state temperature, which ideally is most conducive to NOx storage during operation and regeneration during the regeneration of the first LNT device 210 and/or the second LNT/LNTF device 220. Second, torque stabilization of the ICE system 20 as described herein to facilitate the complete regeneration of the first LNT device 210 and/or second LNT/LNTF device 220.

Deviations between the predicted NOx storage level and the desired NOx storage level can be continuously monitored and employed to make corrections in the emission control system 34 and operation of the first LNT device 210 and second LNT/LNTF device 220 to maintain or optimize the NOx storage, NH3 generation to facilitate further NOx reductions in the SCR device 230, and ultimately emissions from the vehicle 10 within acceptable levels.

As described earlier, the control module 260 monitors the operation of the first LNT device 210, the second LNT/LNTF device 220, the SCR device 230, and DOC device 240 to ensure efficient operation of the emission control system 34 while maintaining acceptable emissions. In particular, the emission control system 34 monitors the NOx and HC emission rates under selected conditions. Likewise, the control module 260 controls the timing of regeneration for the first LNT device 210 and second LNT/LNTF device 220 under selected operating conditions for ICE system 20 and the emissions control system 34 and ensures maintaining exhaust gas emissions at acceptable levels. That is, for example, insufficient regeneration within the emission control system 34 can result in undesirable NO species emissions ("NOx breakthrough") from the emission control system 34 (e.g., via a vehicle tailpipe), while excessive regeneration may result in excessive hydrocarbon emissions as well as NOx passing through the SCR device 230 unreacted or exiting the SCR device 230 as unreacted $NO_x$.

Figure 5:
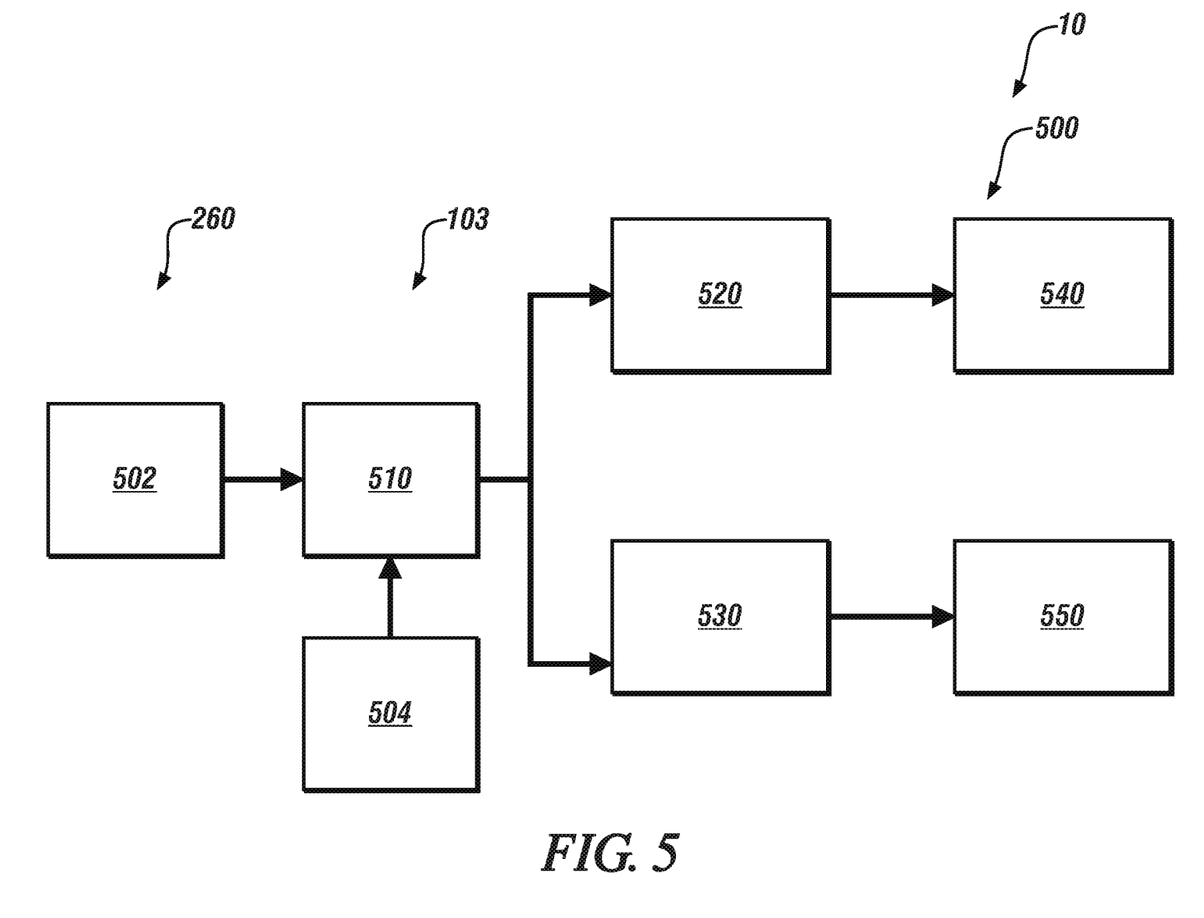
FIG. 5 illustrates a flowchart of an illustrative method for according to one or more embodiments.

Accordingly, referring back to FIGS. 1 and 2, and turning now to FIG. 5 as well, the motor controller 103 or control module 260 controls the operation of the emissions control system 34 based on the selected or constrained operation of the vehicle 10 and ICE system 20. As described herein, the emission control system 34 operates by storing NOx in the first LNT device 210 or second LNT/LNTF device 220. However, eventually, the substrate 214 of the first LNT device 210 and/or the substrate 224 of the second LNT/LNTF device 220 will saturate and lose its effectiveness to adsorb NOx. To prevent such saturation, the substrates 214, 224 need to be regenerated, either via rich engine operation or additional heating applied by the first heating device 208 or optional second heating device 218 for the first LNT device 210 or second LNT/LNTF device 220, respectively. However, regenerating either LNT device 210, 220 can be negatively impacted by further operation of the ICE system 20, particularly at varied ICE system 20 operating conditions.

To address this concern, in one embodiment, the controller 103 executes a process 200 for avoiding excessive NOx generation in ICE system 20 operations as well as maintaining the torque of the ICE 20 substantially constant. The method 500 is implemented by the one or more of the charge controller 111, motor controller 103, or control module 260, in one or more examples. Alternatively, the method 500 is implemented by one or more electric circuits. In one or more examples, the method is implemented by execution of logic that may be provided or stored in the form of computer readable and/or executable instructions. In an embodiment, the process 500 initiates with monitoring the operation of the torque demand (e.g., from the operator) for the vehicle 10 as depicted at process block 502. High torque demands (e.g., acceleration), typically results is high fuel usage, and thereby high levels of exhaust gas generation. As a result, the higher levels of exhaust gas 206 generation leads to higher levels of NOx in the exhaust gases 206. In addition, the requirements of the emissions control system 34 are also monitored in manner to determine if a regeneration event is required or in process for either the first LNT device 210 or the second LNT/LNTF device 220 as depicted at process block 504.

To address these peak torque demands by the operator, in an embodiment the method 500 controls the engine torque demanded of the ICE system 20 to a selected limit. In one embodiment, the vehicle 10 employs a control scheme that limits the torque peaks demanded of the ICE system 20. This torque peak shaving, ensures avoiding the operating conditions for the ICE system 20 that exhibit significant NOx production, and thereby place the greatest burden on the emission control system 34 to be able to ensure acceptable emissions. The method 500 also operates to commands the ICE system 20 to operate at a lower torque value than the current demanded torque as depicted at process blocks 530 and 550. The lowered torque limit value may be selected based on the current operating conditions of the vehicle 10, the current torque request, a preset limit, and the like. Simultaneously, the motor controller 103, commands the electric motor 105 to make up the difference in the torque required and the preselected value as depicted at process block 520 to avoid any perceptible difference to the user of the vehicle 10. Finally, at process block 540 the difference in torque is maintained by the electric motor 105. Accordingly, the control module 260 and motor controller 103 control a combination of torque provided by the ICE system 20 and the electric motor 105 to ensure limited generation of NOx under a wider set of operating conditions. This approach then facilitates maintaining emissions at acceptable levels and the sufficient regeneration of the first LNT device 210 and/or the second LNT/LNTF device 220.

Continuing with FIG. 5, if regeneration of the first LNT device 210 or the second LNT/LNTF device 220 is required or in process, the control system for the ICE system 20 commands the ICE system 20 to operate at a fixed torque at a preselected value less than the current demand as depicted at process blocks 530 and 550. The preselected torque limit value may be selected based on the current operating conditions of the vehicle 10, a preset limit, and the like. In some embodiments, the preselected value may be zero or a nominal value. Simultaneously, the motor controller 103, commands the electric motor 105 to make up the difference in the torque required and the preselected value as depicted at process block 220. Finally, at process block 540 the difference in torque is maintained by the electric motor 105. Accordingly, the control module 260 and controller 103 controls an amount of, and timing of, the regeneration of the first LNT device 210 and/or the second LNT/LNTF device 220 to ensure effective regeneration of the first LNT device 210 and or the second LNT/LNTF device 230.

The technical solutions described herein facilitate improvements to emissions control systems used in combustion engines, such as those used in vehicles. The technical features described herein facilitate the emissions control system to provide for NOx reduction in an emissions control system employing an electrically heated low NOx trap in series with a passive SCR device under selected operating conditions. The selected conditions include taking advantage of a diesel electric hybrid system configuration with a control module configured to limit regeneration to selected instances of diesel operation. In some systems, operation is further enhanced by employing a second optionally heated low NOx trap to facilitate NOx capture. Moreover, control algorithms are employed to facilitate peak shaving for high torque demand instance, which typically result in high NOx emissions. In addition, a torque control algorithm is implemented that facilitates maintaining the ICE as substantially a steady state torque condition to facilitate regeneration of one or both of the LNT devices.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

One should note that FIG. 5 shows an architecture, functionality, and/or operation of a possible implementation of software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to illustrative embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas in a hybrid architected motor vehicle including a NOx generating internal combustion engine and an electric motor, each of the internal combustion engine and an electric motor configured to provide torque operably coupled to a drive train the vehicle, the emissions control system comprising:
   a first electric heating device operably disposed in an exhaust conduit operably connected to the internal combustion engine, the exhaust conduit carrying the exhaust gas;
   a first Lean NOx Trap (LNT) device disposed in the exhaust conduit downstream of the first electric heating device;
   a second LNT device disposed in the exhaust conduit downstream of the first LNT;
   a passive selective catalytic reduction (SCR) device disposed in the exhaust conduit downstream of the second LNT device;
   a hydrocarbon oxidation catalyst device disposed in the exhaust conduit downstream of the passive SCR device; and a controller operably connected to the first electric heating device, a first NOx sensor, and a first temperature sensor, the controller configured to execute a method of controlling the NOx emissions of the NOx generating internal combustion engine, the method comprising:
predicting, with a LNT chemical model within the controller and based upon signals from said first NOx sensor, an amount of NOx stored in at least one of the first and second LNT devices;
and commanding a regeneration of at least one of the first and second LNT devices when the respective predicted amount of NOx stored exceeds a selected threshold, said regeneration comprising:
monitoring a torque demand for the vehicle;
maintaining the internal combustion engine torque substantially constant by operating the internal combustion engine at a fixed torque at a preselected value less than the torque demand; and
operating the electric motor, with the internal combustion engine operating at said fixed torque, to provide sufficient torque to satisfy the torque demand, wherein the fixed torque in addition to the sufficient torque equals the torque demand.

2. The emissions control system of claim 1, wherein the fixed torque is based on at least one of an operating condition of the vehicle, an operating condition of the internal combustion engine, and the torque demand.

3. The emissions control system of claim 1, wherein the first electric heating device is configured to facilitate regeneration of at least one of the first LNT device, the second LNT device, the passive SCR device and the hydrocarbon oxidation catalyst device.

4. The emissions control system of claim 3, wherein the second LNT device is responsive to regeneration at a temperature that is different than that for the first LNT device.

5. The emissions control system of claim 1, further including a second electric heating device disposed in the exhaust conduit, the second electric heating device configured to facilitate regeneration of at least one of the second LNT device and the hydrocarbon oxidation catalyst device.

6. The emissions control system of claim 1, wherein at least one of the second LNT device, the passive SCR device, and the hydrocarbon oxidation catalyst device comprises a particulate matter filter.

7. The emissions control system of claim 1, further including a temperature sensor operably connected to the controller and in fluid communication with the exhaust gas.

8. The emissions control system of claim 1, further including a NOx sensor operably connected to the controller and in fluid communication with the exhaust gas.

9. A method for treating exhaust gas emitted by a NOx generating internal combustion engine in a hybrid architected motor vehicle with an electric motor, where each of the internal combustion engine and an electric motor are configured to provide torque operably coupled to a drive train the vehicle, the method comprising:
operably disposing a first electric heating device in the exhaust gas carried by an exhaust conduit operably connected to the internal combustion engine;
operably disposing a first Lean NOx Trap (LNT) device in the exhaust conduit downstream of the first electric heating device;
operably disposing a second LNT device in the exhaust conduit downstream of the first LNT device;
operably disposing a passive selective catalytic reduction (SCR) device in the exhaust conduit downstream of the second LNT device;
operably disposing a hydrocarbon oxidation catalyst device in the exhaust conduit downstream of the passive SCR device;
operably connecting a controller to the first electric heating device and to a NOx sensor disposed in fluid communication with the exhaust gas, the controller configured to execute a method of controlling the NOx emissions of the NOx generating internal combustion engine, the method comprising:
predicting, with a LNT chemical model within the controller and based upon signals from said NOx sensor, an amount of NOx stored in at least one of the first and second LNT devices: and
commanding a regeneration of at least one of the first and second LNT devices when the respective predicted amount of NOx stored exceeds a selected threshold, said regeneration comprising:
monitoring a torque demand for the vehicle;
maintaining the internal combustion engine torque substantially constant by operating the internal combustion engine at a fixed torque at a preselected value less than the torque demand; and
operating the electric motor, with the internal combustion engine operating at said fixed torque, to provide sufficient torque to satisfy the torque demand, wherein the fixed torque in addition to the sufficient torque equals the torque demand.

10. The method of claim 9, wherein the fixed torque is based on at least one of an operating condition of the vehicle, an operating condition of the internal combustion engine, and the torque demand.

11. The method of claim 9, further including facilitating regeneration of at least one of the first LNT device, the second LNT device, the passive SCR device and the hydrocarbon oxidation catalyst device with the first electric heating device.

12. The method of claim 9, further including disposing a second electric heating device in the exhaust conduit and facilitating regeneration of at least one of the second LNT device and the hydrocarbon oxidation catalyst device with the second electric heating device.

13. The method of claim 9 wherein at least one of the second LNT device, the passive SCR device, and the hydrocarbon oxidation catalyst device comprises a particulate matter filter.

14. The method of claim 9, further including operably connecting a temperature sensor to the controller, the temperature sensor disposed in fluid communication with the exhaust gas.

* * * * *